United States Patent
Soto et al.

(10) Patent No.: US 9,954,714 B2
(45) Date of Patent: Apr. 24, 2018

(54) SYSTEM AND METHOD FOR BLINDLY ACQUIRING FREQUENCY HOPPED SPREAD SPECTRUM SIGNALS

(71) Applicant: THE BOEING COMPANY, Chicago, IL (US)

(72) Inventors: Ely Soto, Lorton, VA (US); James Chris Rector, Fairfax, VA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/143,289

(22) Filed: Apr. 29, 2016

(65) Prior Publication Data

US 2017/0317870 A1    Nov. 2, 2017

(51) Int. Cl.
  H04L 27/26    (2006.01)
  H04L 1/24     (2006.01)
  H04L 12/26    (2006.01)
  H04B 1/713    (2011.01)

(52) U.S. Cl.
  CPC .......... *H04L 27/2666* (2013.01); *H04L 1/245* (2013.01); *H04L 43/028* (2013.01); *H04B 1/713* (2013.01)

(58) Field of Classification Search
  CPC . H04L 5/0007; H04L 27/265; H04L 27/2657; H04L 27/2662; H04L 27/2666; H04B 7/0452
  USPC .......................................... 375/130–134, 340
  See application file for complete search history.

(56) References Cited

U.S. PATENT DOCUMENTS

| | | | | |
|---|---|---|---|---|
| 2003/0223460 A1* | 12/2003 | Smith | .................... | H04H 60/96 370/486 |
| 2004/0228270 A1* | 11/2004 | Chen | ................... | H04L 27/2657 370/210 |
| 2006/0083319 A1* | 4/2006 | Giannakis | ............ | H04B 1/7183 375/259 |
| 2007/0264939 A1* | 11/2007 | Sugar | ................... | H04B 17/309 455/67.11 |
| 2008/0171560 A1* | 7/2008 | Olbers | ................. | H04W 12/12 455/456.6 |
| 2009/0262849 A1* | 10/2009 | Jo | ........................ | H04B 1/7163 375/260 |
| 2013/0017794 A1* | 1/2013 | Kloper | .............. | H04W 74/0808 455/63.1 |
| 2013/0322279 A1* | 12/2013 | Chincholi | ............. | H04W 24/10 370/252 |
| 2014/0136138 A1* | 5/2014 | Park | .................... | G01R 31/3172 702/112 |
| 2015/0131565 A1* | 5/2015 | Nakashima | ........... | H04L 1/0026 370/329 |
| 2017/0054480 A1* | 2/2017 | Shattil | .................. | H04B 7/0452 |

\* cited by examiner

*Primary Examiner* — Emmanuel Bayard
(74) *Attorney, Agent, or Firm* — Francisco A. Rubio-Campos; Apogee Law Group P.C.

(57) ABSTRACT

A system and method for acquiring a frequency hopped spread spectrum (FHSS) signal with no prior knowledge about the FHSS signal. In example implementations, an RF signal is received at a receiver. The RF signal is converted into a stream of digital signal levels. Energy detections are identified in the stream of digital signal as possible hops of a FHSS signal. A feature set is blindly acquired for defining an FHSS signal from the energy detections. At least one waveform classification is generated based on the feature set. Energy detections are re-acquired from the RF signal based on the waveform classification.

20 Claims, 10 Drawing Sheets

Shape associated energy detections

Signal Bandwidth and Channel Spacing associated energy detections

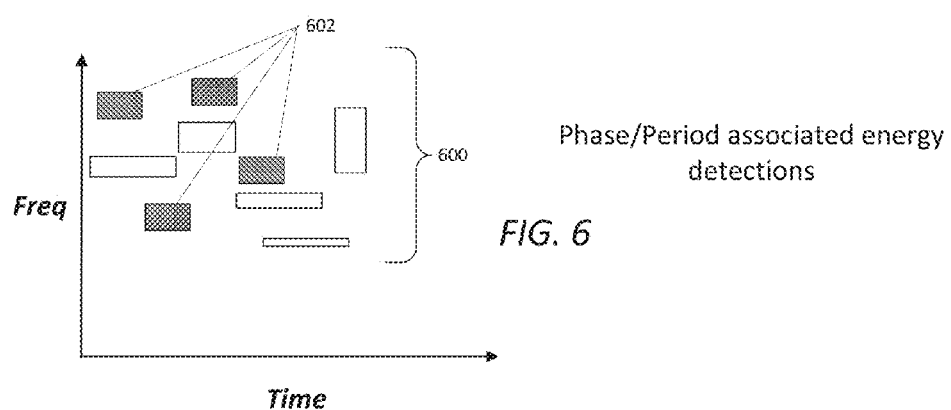
FIG. 6 Phase/Period associated energy detections
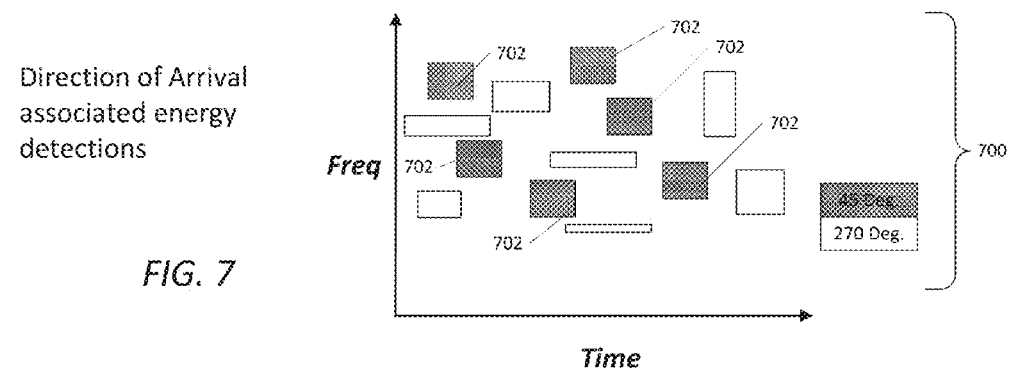
FIG. 7 Direction of Arrival associated energy detections

SYSTEM AND METHOD FOR BLINDLY ACQUIRING FREQUENCY HOPPED SPREAD SPECTRUM SIGNALS

BACKGROUND

1. Field

The present disclosure relates generally to radio signal communication systems, and more particularly, to systems and methods for acquiring signals modulated according to a frequency hopped spread spectrum scheme without prior knowledge of any details about the signal.

2. Related Art

Frequency hopped signals are radio signals transmitted between a transmitter and receiver that periodically switches the carrier among different frequency channels. The Frequency Hopped Spread Spectrum (FHSS) modulation scheme uses a specific sequence known to both the transmitter and receiver to determine a sequence of frequencies on which the signal transmits. In general, the FHSS communication "spreads" its signal over a number of rapidly changing frequencies by "hopping" among the different frequencies in the shared sequence. Frequency hopping techniques are utilized in a variety of applications. The most well-known use of the FHSS technique is in Push-to-Talk radios, radio controlled drones, and long range radios. Frequency hopping is also utilized in agile radar systems in which energy is transmitted with the expectation of receiving a reflection echo from an object of interest. The energy is transmitted as energy bursts at different frequencies.

Frequency hopping provides a number of advantages over fixed-frequency transmission schemes that include resistance to noise interference, security, and shared frequency band usage. With regard to security, a main advantage of utilizing frequency hopping techniques is that frequency hopping provides a low probability of intercept. Transmitters using frequency hopping switch or hop from one frequency to another in a pre-determined sequence. In order for a receiver to properly receive and de-modulate the frequency hopped signal, the receiver must first know the pre-determined hop sequence. Typically, after initiating a frequency hopped connection, the transmitter and receiver may share information that allows each to know any updated hop sequence information so as to allow for continued communication.

Due to the low probability of intercept, frequency hopping techniques are often utilized in military or secure commercial applications. Unfortunately, at present, frequency hopping techniques are also used by criminal enterprises and in other scenarios by people or organizations that would be of interest to law enforcement or public safety officials in general. In such situations, there is a need to intercept the frequency hopped signals of these enterprises, people, or organizations in the interest of public safety. Since in these situations the receiver will not have access to the pre-determined sequence of a target transmitter, there is a need to acquire target frequency hopped signals without having prior knowledge about the details of the target signal.

BRIEF DESCRIPTION OF THE FIGURES

This disclosure may be better understood by referring to the following figures. The components in the figures are not necessarily to scale, emphasis instead being placed upon illustrating the principles of the disclosure. In the figures, like reference numerals designate corresponding parts throughout the different views.

FIG. 6 is a schematic diagram illustrating an example of an implementation of a hopping scheme in which time features are blindly acquired in accordance with the present disclosure.

FIG. 7 is a schematic diagram illustrating an example of an implementation of a hopping scheme in which directional features are blindly acquired in accordance with the present disclosure.

DETAILED DESCRIPTION

In this disclosure, systems and methods are described for acquiring frequency hopped signals from received RF signals without prior knowledge of the details of the frequency hopped signals. In an example of an implementation, the systems and methods described within this disclosure may be performed by an analytical instrument configured to blindly acquire the frequency hopped signals and to generate reports containing details about the frequency hopped signals. In general, the reports with details about the frequency hopped signals may be displayed on a display device integrated with the instrument, printed on an attached printing device, or communicated over a data network to a remote network-connected user. Additionally, in other implementations, the systems and methods may be performed by systems having other signal analysis functions of which a system for acquiring frequency hopped signals is one of the function. Moreover, in other implementations, the systems and methods for acquiring frequency hopped signals may be a part of a signal jamming device where the details of the acquired frequency hopped signals may be utilized to generate jamming signals.

As utilized in this description, the term "component" shall mean either a hardware device, a software function, or program, or a function or program performed utilizing both a software program that interfaces with a hardware device.

Figure 1A:
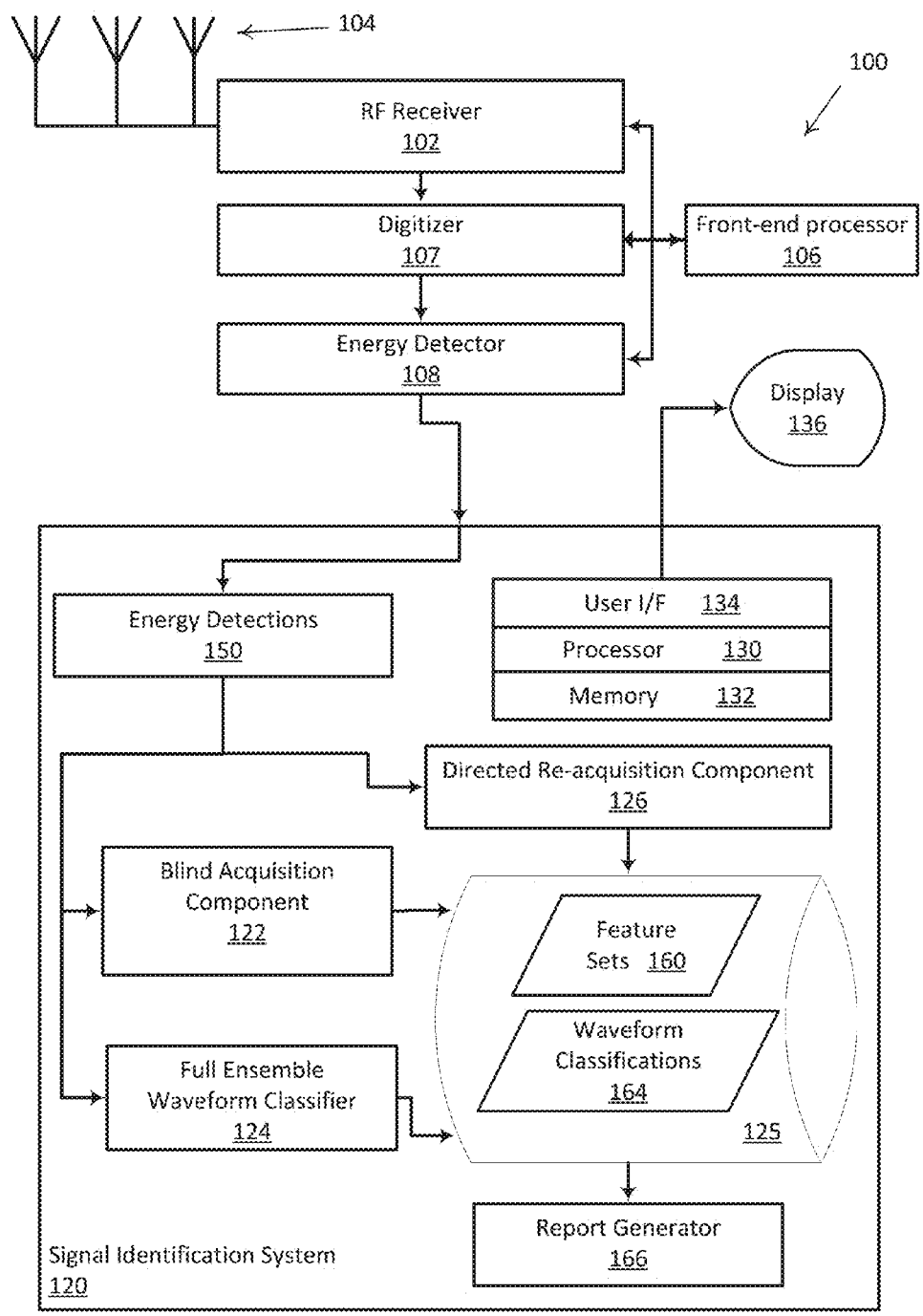
FIG. 1A is a block diagram of an example of an implementation of a system for acquiring a frequency hopped signal without prior knowledge of the details of the signal in accordance with the present disclosure.

FIG. 1A is a block diagram of an example of an implementation of a system 100 for acquiring a Frequency Hopped Spread Spectrum (FHSS) signal without prior knowledge of the details of the signal in accordance with the present disclosure. The system 100 includes a radio frequency (RF) receiver 102, a front-end processor 106 (which may be a signal processor), a digitizer 107, an energy detector 108, and a signal identification system 120. The RF receiver 102, digitizer 107, energy detector 108, and signal identification system 120 include known hardware and software components for receiving RF signals, converting an analog RF signal to a digital signal stream, and to identify energy detections in the digital signal stream. In the example shown in FIG. 1A, the front-end processor 106 is included to perform digital signal processing functions for either the RF receiver 102, the digitizer 107, the energy detector 108, or for the signal identification system 120.

The signal identification system 120 includes both an autonomous and directed re-acquisition system. The autonomous system performs an unsupervised machine learning method that utilizes a maximum likelihood classifier and ensemble learning process that utilizes individual feature acquisition and track algorithms to generate waveform details or classifications that correspond to one or more frequency hopped signals. In this example, the directed re-acquisition system may receive full or partial a priori information from the autonomous system or from a user to add to the details of the waveform classifications. In an example of operation, the signal identification system 120 receives energy detections from energy detector 108 or portions of a digitized RF signal having signal levels above a predetermined threshold over the noise floor estimate. The energy detections are analyzed to generate features about the energy detections, which may be correlated to classify and identify the frequency hopped signal.

The RF receiver 102 is configured to receive RF signals from one or more antennas 104, which are in signal communication with the receiver 102. The RF receiver 102 employs the front-end processor 106 to process the received RF signals, from the RF receiver 102, to generate a digital signal stream from the received RF signals. The digital signal stream is input into the energy detector 108 and the energy detector 108 determines a noise floor estimate for the digital signal stream. The energy detector 108 then identifies, as energy detections, portions of the digital signal stream with levels above the noise floor estimate. It is appreciated by those of ordinary skill in the art that little is known about the energy detections at this point, except that it is possible that the energy detections are not noise. As such, the energy detections represent portions of a signal that may be determined to be a "blindly" (i.e., without prior knowledge of the details of the signal) acquired frequency hopped signal.

The energy detector 108 may utilize known signal processing techniques to identify the energy detections. For example, in an example of an implementation, the energy detector 108 may process the in-phase and quadrature phase (I and Q) digital signal stream using fast Fourier transform analysis over a period of time. The energy detector 108 may perform, for example, 1000 FFTs/sec., or any other suitable number of FFTs/sec., to detect signals at certain frequencies and in certain time slots where such signals have energy levels above the predetermined noise floor. The energy detections may then be identified by the measured signal power, the turn-on and turn-off times in the one second of measurements, the bandwidth, and the center frequency of the signal. The signal identification system 120 may determine features from the acquired energy detections and then determine the likelihood that the features belong to one or more waveforms forming one or more frequency hopped signals.

The energy detections are provided as input to the signal identification system 120, which includes a blind acquisition component 122, a directed reacquisition component 126, and a full ensemble waveform classifier 124. The blind acquisition component 122, the full ensemble waveform classifier 124, and the directed re-acquisition component 126 use maximum likelihood classifiers and derived statistics to correlate the energy detections that belong to the same frequency hopped signal based on correlated features.

The frequency hopped system 100 includes a processor 130, a non-transitory computer storage medium (i.e., memory) 132, and a user interface (I/F) 134. The example illustrated in FIG. 1A employs the front-end processor 106 for signal processing functions, and a second processor 130 (such as, for example, a general purpose processor) for executing software programs that perform functions not directly requiring digital signal processing resources. The software programs may invoke functions that utilize digital signal processing, such as FFT functions, digital filtering functions, or other signal processing functions. In another example of an implementation, the system 100 may operate using a single processor to the extent that the processor is capable of performing signal processing and general processing functions. The memory 132 may be utilized for storing computer readable instructions (such as, for example, software) that when executed by the processor 130 perform the functions required by the blind acquisition component 122, the full ensemble waveform classifier 124, and the directed re-acquisition component 126, as well as other functions or components described with reference to FIGS. 1B and 2-8.

The user interface 134 may provide drivers and other software and hardware for communicating with user interface devices, such as a display device (i.e., display) 136, a printer, a keyboard, a mouse or other pointing type devices, and any other suitable input/output (I/O) device. It is noted that only a display 136 is shown in FIG. 1A; however, user interface devices are well known in the art.

The blind acquisition component 122 is a module, program, sub-system, device, etc. that is configured to perform as multiple independent unsupervised machine learning classification processes where the physical features of the energy detections are the random variables (i.e., features) that need to be observed and learned. Each feature has an unknown probability density function (PDF) and an unknown dependence with the other variables. In addition, a feature may or may not be active and correlated for a particular waveform. The process determines a potential waveform by learning active correlated features in the presence of noise and other independent waveforms.

The blind acquisition component 122 measures waveform characteristics used to determine the features of the energy detections. In this disclosure, the term "feature" shall refer to a parameter or measured signal characteristic that may be used in combination with other features to classify a waveform, or a frequency hopped signal in particular. The features are treated as random variables characterizing a signal about which no information is available. In an example of an implementation, a feature set may include features such as detect power, on-time period or phase, off-time period or phase, detect frequency and bandwidth, direction of arrival, waveform frequency use and bandwidth, waveform burst duration, channel width, and channel spacing. The waveform characteristics are measured in the energy detections to acquire the features of the energy detections. In this example, statistics, such as a PDF, may also be determined for each feature.

Once the features are determined from the energy detections, a feature set is derived from these features by correlating the features using a maximum likelihood classifier. In an example of an implementation, the blind acquisition component 122 includes a blind signal characteristic detector to detect signal characteristics as feature, and a weak maximum likelihood classifier that incorporates Kalman filtering to receive energy detections and to determine the likelihood the energy detections corresponding to a feature set for a potential waveform. The features then may be stored as feature sets 160 in a system database 125.

The full ensemble waveform classifier 124 performs a maximum likelihood classification operation to determine if a potential waveform identified by the blind acquisition component 122 belongs to a known waveform classification. The logic followed by the full ensemble waveform classifier 124 may be the same or similar to that followed by the blind acquisition component 122 as both employ a maximum likelihood classifier. The waveform classifications then may be stored as a set of data containing the details for individual active waveforms that are stored as waveform classification 164 in the system database 125. The full ensemble waveform classifier 124 then adds to the knowledge and the details of the waveforms in the system database 125 as new energy detections, features, and potential waveforms are acquired.

In this example, the blind acquisition component 122 and the full ensemble waveform classifier 124 store and maintain the details about the waveforms in the feature sets 160 and waveform classifications 164 in the system database 125. The feature sets 160 are formed as groups of features that have been correlated, or found to be related and possibly a part of the same waveform, and, further as possibly a part of the same frequency hopped signal. As an example, a feature may be stored with the following example data structure:

```
class feature
{
    type
    Kalman filter parameters
    weight
}
```

In this example, the feature type identifies the signal characteristic that the feature represents, such as power, frequency, time, turn-on time, turn-off time, or any other signal characteristic that may be utilized to identify a frequency hopped signal. Additionally, the Kalman filter parameters are parameters derived from performing a Kalman filter process on the energy detections during blind acquisition of the energy features. The Kalman filtering is described below in more detail with reference to FIG. 3B.

The Kalman filter parameters may be configured with the following data structure:

```
class Kalman Filter data
{
    state variables (state mean estimate, state co-variance)
    PDF
}
```

The state variables in the Kalman Filter parameters data structure include state mean estimates and state co-variances of a given feature, which are maintained and updated for the feature over time. In this example, the state mean estimate is the estimated mean of each state. The state co-variances are the co-variances of each state, where the states are values maintained in accordance with the known Kalman filter process. The PDF is the probability density function for the feature, which includes the mean and standard deviation of the features. In this example, the mean may be extracted from the state mean estimate. The standard deviation may be determined separately from the Kalman filter state variables to define the complete probability density function. The PDF parameters may be defined in a data structure as follows:

```
class PDF
{
    mean;
    standard deviation;
}
```

In this example, as the features are acquired and processed by the maximum likelihood classifier, the features having a sufficient probability of belonging to the same waveform, and in turn, the same frequency hopped signal, are gathered in feature sets and stored in the feature sets 160 data store as data groups. In general, a feature set may be stored in the feature sets 160 data store as an array, or other grouped or indexed data structure. As such, a feature set becomes a potential waveform due to the measure of their likelihood of belonging to the same signal. It is noted that the features in the feature set need not belong to the same feature type that provide a correspondence with the various characteristics that define a signal. As such, a feature set is one of the parameters in the data structure of the waveform classification, which may be defined with the following data structure:

```
class waveform classification
{
    feature set[ ]
    signal type
}
```

In this example, the above data structure defines a basic waveform classification. As the waveform classifications are created from features acquired as energy detections are acquired over time, an active waveform classification data structure may be defined with added parameters. An active waveform classification may be defined to include assigned energy detections and the waveform weight value. The weight value is generated as an average of the weights in the active feature set. That is, as noted above, each feature in the feature set has a weight parameter. The weight parameter of each of the features in the feature set is determined by defining an averaged waveform to generate the weight of the active waveform classification. As an example, an active waveform classification may be defined with the following data structure:

```
class active waveform
{
    feature set[ ],
    assigned energy detections,
    signal type,
    weight
}
```

In this example, the assigned detections in the active waveform classification data structure includes energy detections that have been determined by the Maximum Likelihood Test to be likely to belong together as part of the waveform. The signal type may be one of any signal type to which the waveform may belong. Example signal types include FHSS, Non-Hopped Signal, Radar, etc. As noted above, the weight in the active waveform classification data structure is the average of the weights of the features in the feature set. Each feature has a weight associated with how well that feature is known and correlated. The waveform weight is a measure of how correlated and known all the active features are.

The above defined data structures describe how the measurement of various parameters associated with an energy detection, such as, power, frequency, bandwidth, turn-on time, turn-off time, etc. may be processed and used to learn, with machine learning, about the details of a waveform defining an RF signal. In general, energy detections are processed by the blind acquisition component 122. The blind acquisition component 122 identifies energy detection feature sets 160 as correlated by a maximum likelihood determination that they belong to the same waveform. The full ensemble waveform classifier 124 also determines the likelihood that energy detections, are correlated, except that the determination is made with knowledge derived from all the learned active features and the PDF of the features.

As the details of a waveform are learned, the knowledge is utilized to process energy detections using the acquired knowledge as a priori knowledge. The directed re-acquisition component 126 receives energy detections and determines the likelihood that the energy detections belong to known waveform classifications. The directed re-acquisition component 126 may also utilize a maximum likelihood classifier to determine the likelihood using data in the feature sets 160 and in the waveform classifications 164 stored in the database 125. The directed re-acquisition component 126 may however receive manually entered waveform classifications described in further detail with reference to FIG. 2. Additionally, manually entered waveform classifications also may be entered by a user through a user interface, or directly through an I/O connection that may include data network connections.

In this example, the signal identification system 120 generates and maintains waveform classifications including details about the waveforms, particularly for waveforms defining frequency hopped signals. The waveform classifications may be generated in a report by a report generator 166. The report generator 166 may output the waveform classifications and frequency hopped signal details on the display 136.

As noted above, maximum likelihood classifiers are used in performing functions for the blind acquisition component 122, the full ensemble waveform classifier 124, and the directed re-acquisition component 126. In this example, various maximum likelihood classifiers may be selected for use by each component.

Figure 1B:
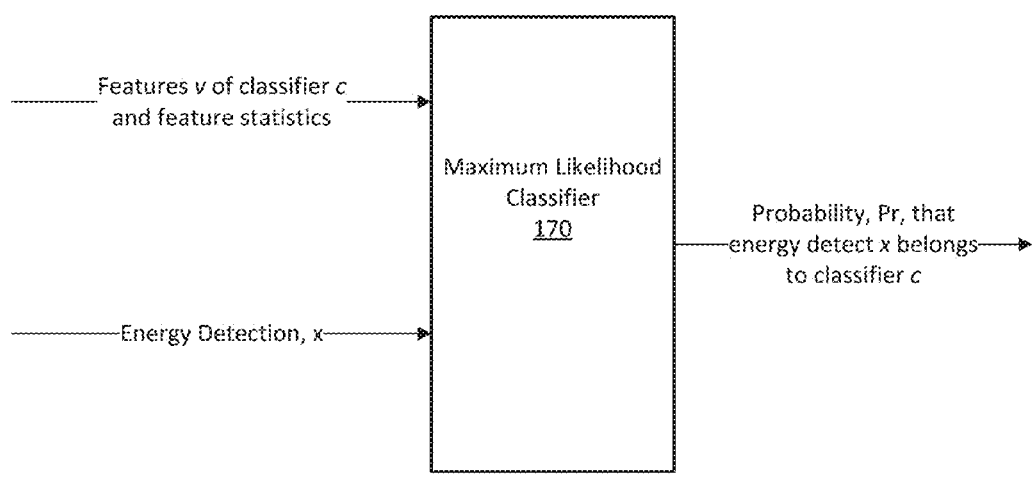
FIG. 1B is a block diagram illustrating the utilization of a maximum likelihood classifier in acquiring feature sets and waveform classifications.

Turning to FIG. 1B, FIG. 1B is a block diagram illustrating utilization of a maximum likelihood classifier 170 in acquiring feature sets and waveform classifications. The maximum likelihood classifier 170, in FIG. 1B, may be configured as a weak classifier in blindly acquiring feature sets from the energy detections as described in more detail below with reference to FIGS. 3A and 3B. In general, the maximum likelihood classifier 170 receives energy detections, x, (which may be processed by ensemble learning algorithms that detect various features that may be particularly relevant to frequency hopped signals) as input, and may also receive features of a classifier c and related feature statistics, which may include the PDF for one or more features, Kalman filter states for one or more features, weights, co-variances, and other suitable statistics as required by the selected maximum likelihood classifier. In this example, the output of the maximum likelihood classifier 170 is a probability (Pr) that the feature set associated with the energy detection, x, belongs in the active waveform being tested.

In this example, the maximum likelihood classifier 170 may be configured for use as the full ensemble waveform classifier 124 (shown in FIG. 1A) by providing feature sets or potential waveforms as an input in addition to an input of the energy detections. Additionally, in this example, the features of classifiers and feature statistics includes a larger set of features, v, and feature statistics that are based on the expanded learning about the waveform classifications over time.

As noted above, any suitable maximum likelihood classifier may be utilized. In one example of an implementation, the maximum likelihood classifier 170 may be implemented utilizing a cumulative distribution function ("CDF") that may be constructed over time using observed features in the energy detects collected over time. In this example, the features of the energy detections being tested are utilized to produce a point on the CDF curve. The point on the CDF curve is a Pr having a value between 0 and 1. In this example, the mean and standard deviations used to produce the CDF, may be obtained from Kalman filtering as described below with reference to FIGS. 3A and 3B.

In another example of an implementation, the maximum likelihood classifier 170, which may be implemented for either the blind acquisition component 122, the full ensemble waveform classifier 124, or the directed re-acquisition component 126, may be a Gaussian Naïve Bayesian Maximum Likelihood Classifier. Furthermore, other classifiers may be implemented in other examples that include, without limitation:

1. Multivariate (Joint) Bayes Classifier;
2. Mahalanobis or Fischer Distance;
3. Bayesian Decision Tree;
4. Neural Networks;
5. Principal Component Analysis; and
6. Support Vector Machines.

In general, as additional energy detections are acquired, additional features and feature sets are acquired so that additional waveform classifications are identified. As an example, for active waveforms, or waveforms of signals still in the process of communicating data, the features, feature sets 160, and waveform classifications 164 are sufficiently robust that energy detections may be directly correlated with waveform classifications 164 to refine the knowledge accumulated for active waveforms. In some example implementations, additional information may be included in the waveform classifications 164 to allow for more efficient correlation of additional energy detections. The directed re-acquisition component 126 may perform similar maximum likelihood classifications of new energy detections as well as new features and feature sets. Additionally, the directed re-acquisition component 126 may also include a user-input or model waveform classifications to re-acquire energy detections. In an example of an implementation, waveform classifications may be generated and correlated with existing waveform classifications 164 to refine the knowledge about existing waveform classifications 164, or about newly generated waveform classifications.

Figure 1C:
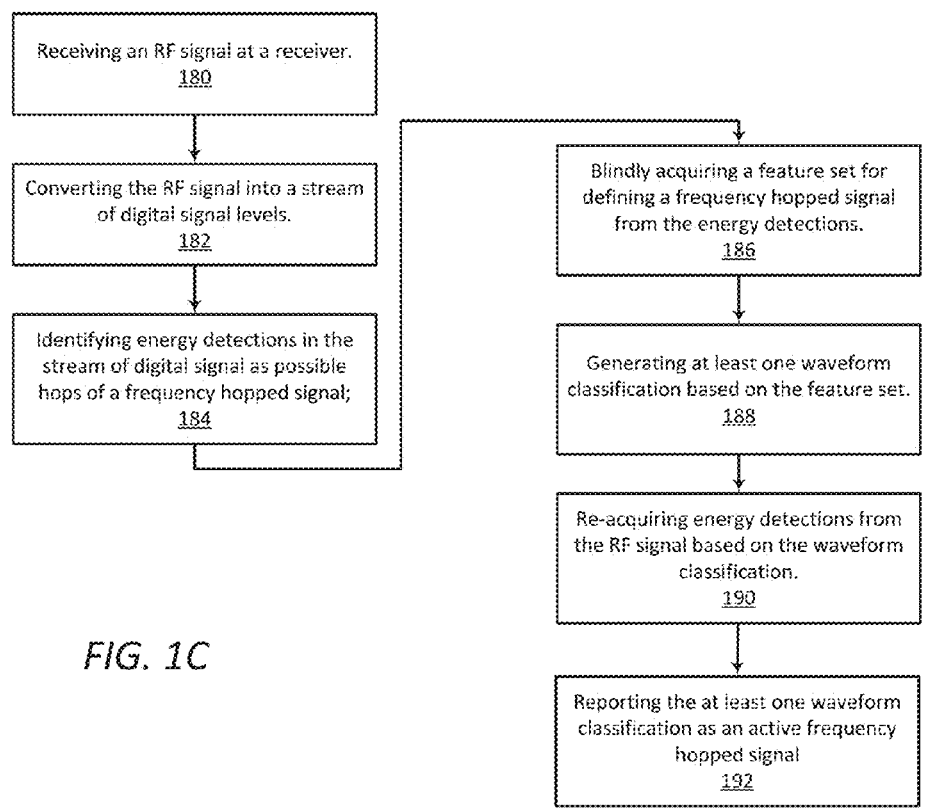
FIG. 1C is a flowchart illustrating the operation of an example of an implementation of method for acquiring a frequency hopped signal without prior knowledge about the signal in accordance with the present disclosure.

FIG. 1C is a flowchart illustrating the operation of an example of an implementation of a method for acquiring a frequency hopped signal without prior knowledge about the signal. The method depicted in the flowchart in FIG. 1C may be performed using, for example, the system 100 in FIG. 1A, although such a system 100 may take other forms. The process begins and, at step 180, an RF signal is received at a RF receiver. The RF receiver may include a single antenna, or multiple antennas arranged in an array to allow for a determination of direction of arrival. In step 182, the RF signal is converted into a stream of digital signal levels, preferably, as I,Q signal levels as is known in the art. At step 184, energy detections are identified in the stream of digital signal levels. In this example, step 184 may include performing a predetermined number of FFTs during a selected measurement period. For example, the energy detector 108, FIG. 1A, may perform 1000 FFTs on the stream of digital signal levels in a period of one second. A noise floor is estimated from the FFTs and each FFT time slot is tested against the noise floor estimate to determine if that FFT time slot may be a potential hop in a frequency hopped signal. Then each potential hop is identified as an energy detection for further testing.

In systems having an N-antenna array, step 184 may also include steps of:
  receiving RF signals at an N-antenna array, and
  pre-filtering the RF signals received at the N antennas based on direction of arrival.

The process of blindly acquiring features may include using a direction acquisition detector to detect a waveform direction of arrival, which may correlate direction of arrival features with other features in a feature set.

In step 186, the energy detections are analyzed to identify a feature set that may describe a waveform for a frequency hopped signal. The analysis of the energy detections may be performed by acquiring shape, frequency, time, and direction (if available) features and analyzing the potential features using corresponding weak classifiers. At step 188, at least one waveform classification is generated from the feature set or sets identified in step 186. In step 188, additional feature statistics may be determined based on prior generated waveform classifications in determining if the potential waveform or feature set from step 186 belongs to a waveform classification. As energy detections are received, the step of generating waveform classifications involves storing the waveform classification information and continuously updating the information. At step 190, energy detections are tested utilizing direct re-acquisitioning based on a joint likelihood determined from all waveform classification knowledge that is available that also includes manually entered waveform classifications. In step 192, the generated waveform classifications are reported to a user of the system on a display, or other user interface. As the waveform classifications are refined, their classification as a frequency hopped signal may be updated and reported as well.

Figure 2:
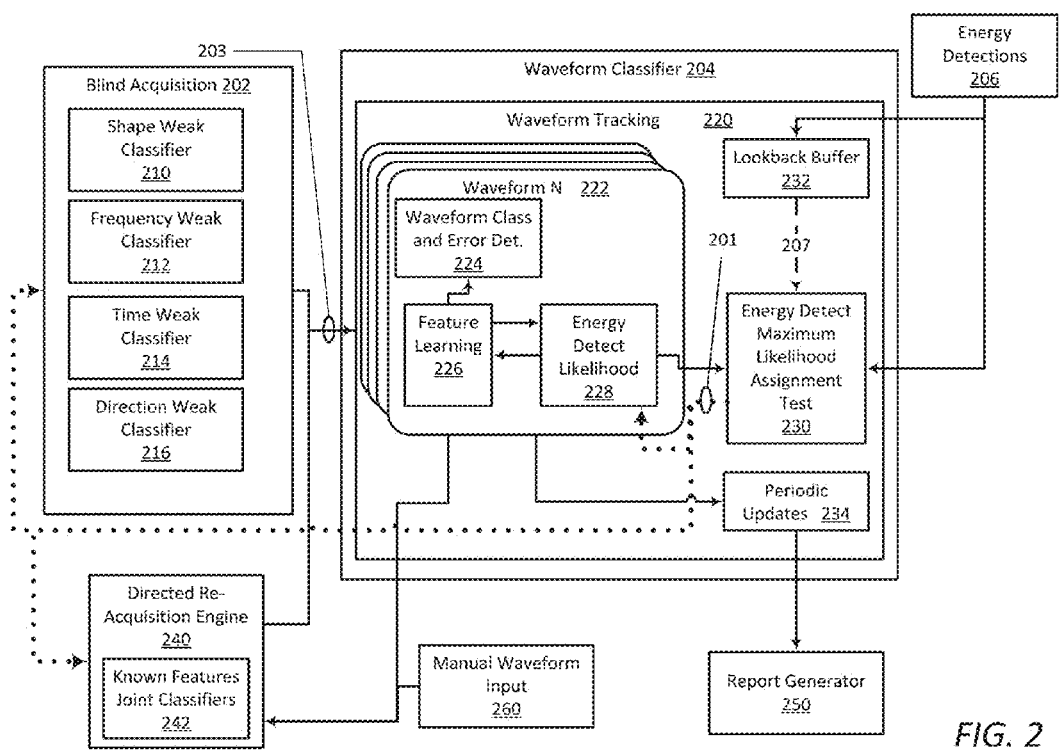
FIG. 2 is a block diagram of an example of an implementation of a blind feature acquisition and waveform classification system that is utilized as an example system for blindly acquiring an FHSS signal in accordance with the present disclosure.

Turning to FIG. 2, a block diagram is shown of an example of a signal identification system 200 that may be used in an example system for blindly acquiring a frequency hopped signal. FIG. 2 illustrates the signal identification system 200 implemented in two basic tiers: a blind acquisition tier 202 and a waveform classification tier 204. The signal identification system 200 incorporates the idea that initially, no prior knowledge is available to process the energy detections, but as additional energy detections are acquired, additional features and features sets are acquired to generate more waveform classifications and/or more knowledge about identified waveform classifications.

In the signal identification system 200, the blind acquisition tier 202 includes a shape weak classifier 210, a frequency weak classifier 212, a time weak classifier 214, and a direction weak classifier 216. The input of energy detections is indicated by energy detections 217 with inputs to a lookback buffer 232 and an energy detect maximum likelihood assignment test 230 in the waveform classifier tier 204. The energy detections are tested as discussed below using functions of the waveform classifier tier 204 and unassigned energy detections at 201 are input at the blind acquisition tier 202. It is noted that the signal identification system 200 illustrates the processing of energy detections in the context of having prior knowledge of the waveform acquired from continuously processing energy detections in the received RF signal. The energy detections 217 are tested against this knowledge before processing without prior knowledge of the signal details.

In the blind acquisition tier 202, unassigned energy detections are processed by the shape weak classifier 210, the frequency weak classifier 212, the time weak classifier 214, and the direction weak classifier 216. Each weak classifier (210-216) processes the energy detections to identify features in the energy detections that may correspond to features of a waveform for a frequency hopped signal. Each is a weak classifier (210-216) in that the likelihood of belonging to a waveform, or at this stage, a feature set, or a potential waveform, is determined using feature sets as opposed to using more developed waveform classifications as is done in the waveform classifier tier 204. In this example, each weak classifier (210-216) includes a feature detection process to identify features corresponding to particular signal characteristics of a frequency hopped signal.

Figure 3A:
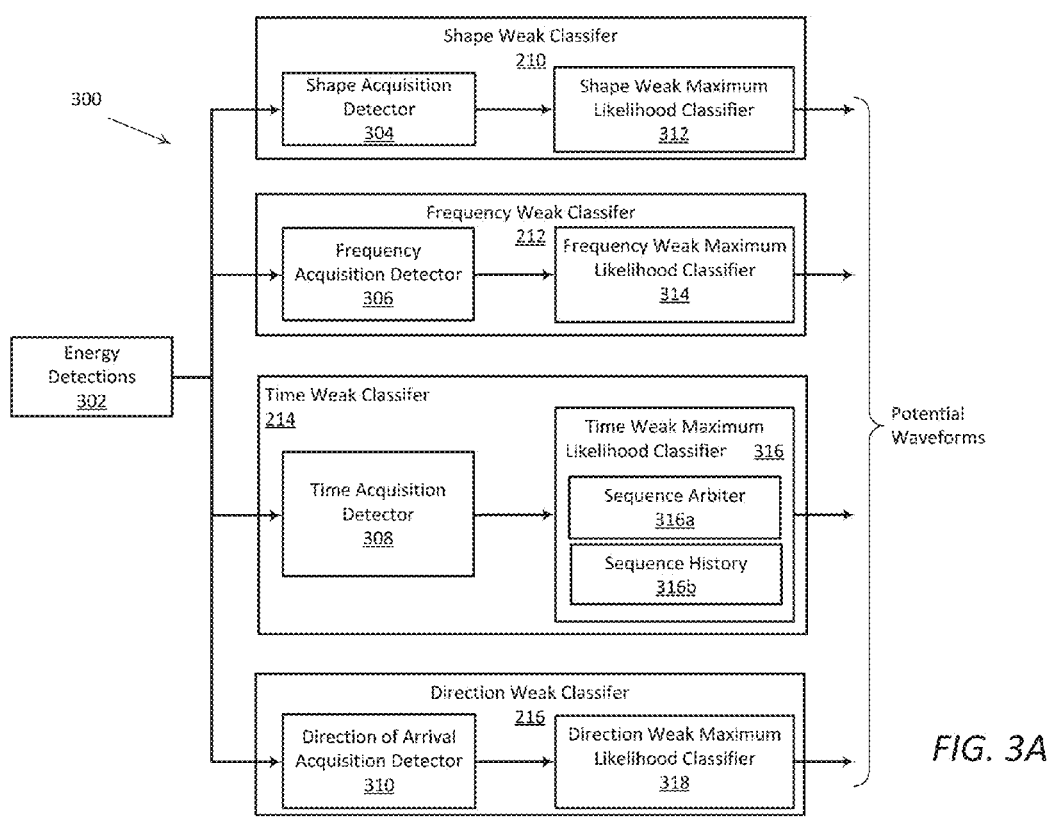
FIGS. 3A and 3B are block diagrams of an example of an implementation of weak classifiers for blindly acquiring features from energy detections in accordance with the present disclosure.
Figure 3B:
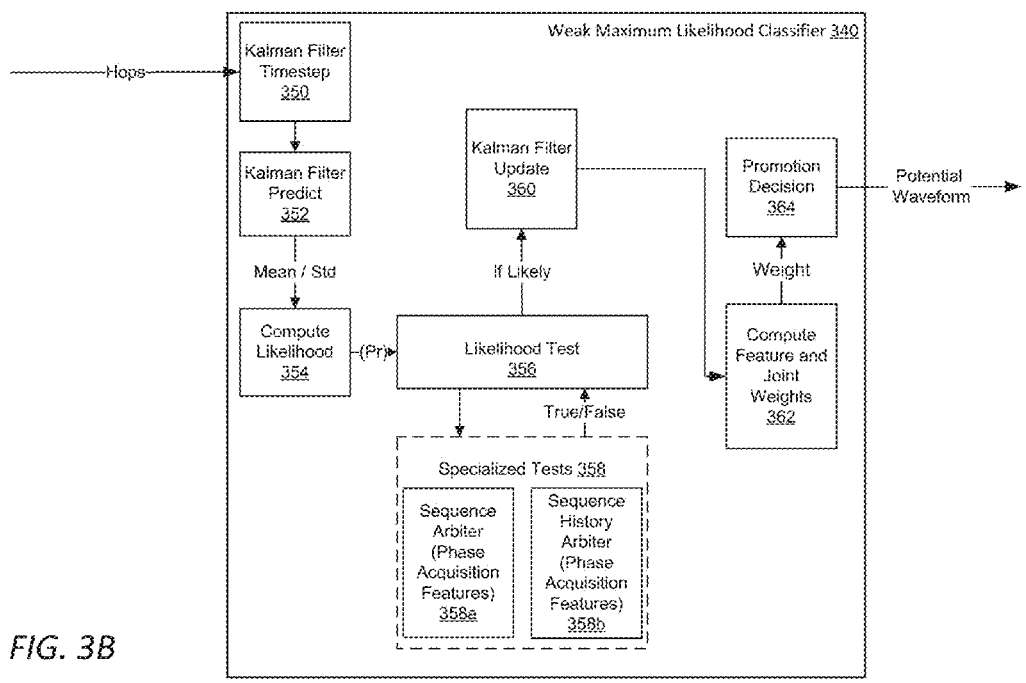

Turning to FIGS. 3A and 3B, these figures show examples of weak classifiers that may be implemented in the signal identification system 200 shown in FIG. 2. Referring to FIG. 3A, energy detections 302 are input for the shape weak classifier 210, the frequency weak classifier 212, the time weak classifier 214, and the direction weak classifier 216. Each weak classifier identifies features that may belong to a feature set by analyzing features of multiple energy detections to determine if they are correlated by maximum likelihood. The analysis of the energy detections then utilizes a positive correlation result to indicate that the energy detections are potential hops in a frequency hopped signal. The feature is then marked as active and added to the feature set. The maximum likelihood analysis determines the possibility that the energy detects are similar by one or more features.

Figure 4:
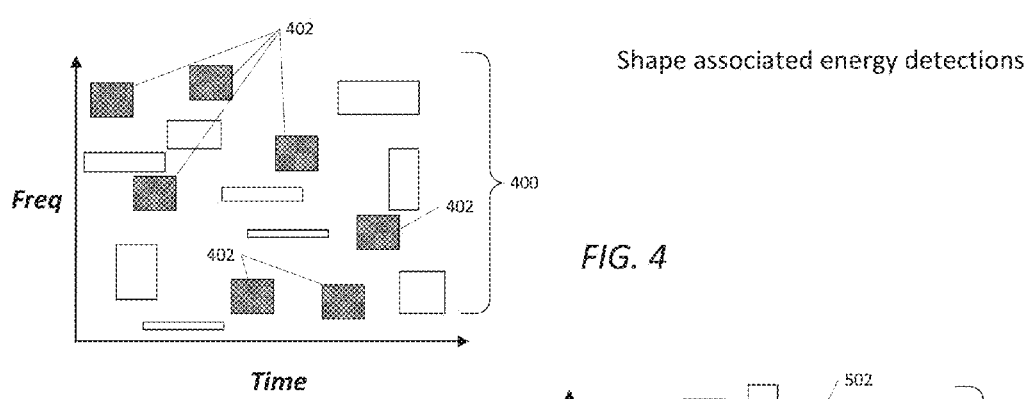
FIG. 4 is a schematic diagram illustrating an example of an implementation of a hopping scheme in which shape features are blindly acquired in accordance with the present disclosure.

The shape weak classifier 210 includes a shape acquisition detector 304 and a shape weak maximum likelihood classifier 312. The shape acquisition detector 304 analyzes the energy detections 302 to measure signal characteristics corresponding to waveform shape characteristics, such as, for example, the signal bandwidth, dwell and absolute power of the energy detections. In FIG. 4, an example is shown that illustrates how energy detections are analyzed by the shape acquisition detector 304 to acquire shape features from the energy detections. As noted above, each energy detection 302 is a portion of a signal at a time slot in a period of measurements. Each energy detection 302 may be characterized by the signal power, bandwidth, center frequency, turn-on time, and turn-off time at one of a number of FFTs performed over a period of time. FIG. 4 shows a collection of energy detections 400 in a frequency hopper format in which frequency is plotted along a vertical axis and time is plotted along a horizontal axis. The shape acquisition detector 304 (in FIG. 3A) may determine bandwidth, dwell, and absolute power of each energy detection and identify a set of possible hops 402 for a frequency hopped signal. The determined parameters (bandwidth, dwell, and absolute power) define the shape of each energy detection, which appears to be the same for each of the possible hops 402.

Referring back to FIG. 3A, the set of possible hops 402 in FIG. 4 are then processed by the shape weak maximum likelihood classifier 312 to determine the likelihood of belonging to the same feature set. The shape weak maximum likelihood classifier 312 may perform Kalman filtering to track feature values to their true estimates. This process is described in more detail with reference to FIG. 3B.

Figure 5:
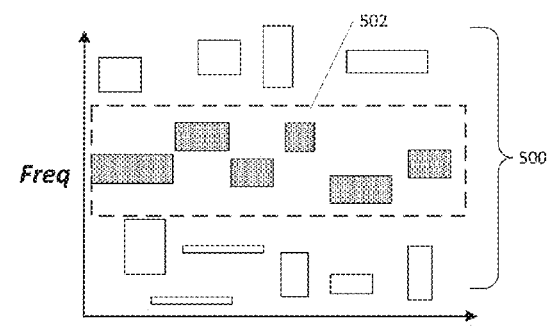
FIG. 5 is a schematic diagram illustrating an example of an implementation of a hopping scheme in which frequency features are blindly acquired in accordance with the present disclosure.

The frequency weak classifier 212 includes a frequency acquisition detector 306 and a frequency weak maximum likelihood classifier 314. The frequency acquisition detector 306 analyzes the energy detections 302 to determine waveform frequency characteristics of the energy detections. Turning to FIG. 5, FIG. 5 illustrates how energy detections may be analyzed by the frequency acquisition detector 306 to acquire waveform frequency characteristics from the energy detections. In FIG. 5, a collection of energy detections 500 in a frequency hopper format is shown. The frequency acquisition detector 306 (in FIG. 3A) may analyze waveform frequency characteristics to determine a signal center frequency, a frequency, a total bandwidth, and channel spacing of each energy detection and identify additional features for correlating a set of possible hops 502.

Referring back to FIG. 3A, the set of possible hops 502 in FIG. 5 are processed by the frequency weak maximum likelihood classifier 314 to determine the likelihood of belonging to the same feature set. The frequency weak maximum likelihood classifier 314 may perform Kalman filtering to track feature values to their true estimates.

The time weak classifier 214 includes a time acquisition detector 308 and a time weak maximum likelihood classifier 316. The time acquisition detector 308 analyzes the energy detections 302 to determine waveform time characteristics of the potential frequency hopped signal. Turing to FIG. 6, FIG. 6 illustrates how energy detections may be analyzed by the time acquisition detector 308 to acquire time or phase related features from the energy detections. FIG. 6 also shows a collection of energy detections 600 in a frequency hopper format. The time acquisition detector 308 (in FIG. 3A) may analyze time or phase characteristics to acquire a signal based on the periodic repetition of the energy detections and their relative time offset (or phase). Features acquired by the time acquisition detector 308 include the rising edge time offset (phase), rising edge period, falling edge time offset (phase), and falling edge period. Energy detections with similar time or phase characteristics are determined to be possible hops 602.

Referring back to FIG. 3A, the set of possible hops 602 in FIG. 6 are processed by the time weak maximum likelihood classifier 316 to determine the likelihood of belonging to the same feature set. The time weak maximum likelihood classifier 316 may perform Kalman filtering to track feature values to their true estimates.

It is noted that each weak classifier may include specialized tests for further expanding the information available about the feature sets. The time weak maximum likelihood classifier 316 in FIG. 3A includes a sequence arbiter 316a and a sequence history 316b. In general, the sequence arbiter 316a and sequence history 316b track details if the sequences and store the sequences as having:
1. Sequence number;
2. Likelihood; and
3. Highest likelihood energy detection identifier.

The sequence arbiter 316a identifies the best features from the possible hops as those belonging to a possible sequence of hops. For example, hops may be found to appear in the same time slot at the same frequency. The sequence history 316b may be utilized to correlate hops appearing in sequences. The sequence arbiter 316a and sequence history 316b tests may provide information about the sequence that a signal uses to switch frequencies in each time slot.

The direction weak classifier 216 includes a direction acquisition detector 310 and a direction weak maximum likelihood classifier 318. Turning to FIG. 7, FIG. 7 illustrates how energy detections may be analyzed by the direction acquisition detector 310 to determine a direction of arrival for the energy detections. In a receiver (such as RF receiver 102 in FIG. 1A) having multiple antennas (N-antennas) in an array formed so that each antenna focuses on signals from a specific direction, the signals from each antenna may be compared to determine which antenna receives the strongest signal. The direction acquisition detector 310 may determine a direction of travel for each energy detection and identify those energy detections received from the same direction. In FIG. 7, some energy detections 700 are identified as received from a direction of 270 degrees and set of energy detections received from a direction of 45 degrees. The direction of arrival may be identified as a feature for a set of possible hops 702.

Referring back to FIG. 3A, the set of possible hops 702 in FIG. 7 are processed by the direction weak maximum likelihood classifier 318 to determine the likelihood of belonging to the same feature set. The frequency weak maximum likelihood classifier 314 may perform Kalman filtering to track feature values to their true estimates.

The shape weak maximum likelihood classifier 312, the frequency weak maximum likelihood classifier 314, the time weak maximum likelihood classifier 316 and the direction weak classifier 318 receive features that are possibly related and determines the extent to which they are related. Referring to FIG. 3A, a weak maximum likelihood classifier 340 is illustrated as representative of the shape weak maximum likelihood classifier 312, the frequency weak maximum likelihood classifier 314, the time weak maximum likelihood classifier 316 and the direction weak classifier 318. The weak maximum likelihood classifier 340 receives potential hops as input to a series of Kalman filter processes, Kalman filter time step 350 and Kalman filter predict 352, which generate a mean and standard deviation of the features as state variables. The state variables are used to compute a likelihood at 354 that the features are related generating a Pr as indicating the likelihood. The Pr is tested against a threshold probability of likelihood at a likelihood test 356. The likelihood test 356 may use information from any specialized tests 358 that may be performed for a given weak classifier, such as a sequence arbiter 358a and a sequence history 358b.

If the likelihood test 356 determines that the likelihood, Pr, is sufficiently high, a Kalman filter update 360 is performed as is typical in the Kalman filter process. State variables are updated with the new information from the added features. Following the Kalman filter update, the feature weights for the features in the feature sets are computed at 362. The weights are utilized to determine if the features should form a feature set as a potential waveform at 364.

Referring back to FIG. 2, the blind acquisition tier 202 generates potential waveforms 203, or feature sets, for use in a full ensemble waveform classification by the waveform classifier tier 204. The potential waveforms 203 are processed in a waveform tracking process 220 to determine if the potential waveforms likely belong to one of a number N of active waveforms 222. For each waveform N 222, an energy detect likelihood test 228, a feature learning process 226, and a waveform classification and error detection process 224 is performed. The waveform tracking process 220 also includes an energy detection maximum likelihood assignment test 230, and a periodic updates process 234. The energy detections 206 may be received via a lookback buffer 232 as described below.

The energy detect likelihood test 228 computes the likelihood that an unassigned energy detection belongs to a particular waveform N 222. The unassigned energy detection may be received and tested to determine if it belongs to known waveform classifications and if not, the energy detection remains unassigned and processed by the blind acquisition tier 202. The energy detect likelihood test 228 utilizes the acquired feature knowledge of the waveform N 222 and information learned from the feature learning process 226 to compute a probability that the energy detect belongs to the waveform N 222. In an example of an implementation, a mean and standard deviation of a feature is used to produce a Gaussian CDF to produce a likelihood value.

The feature learning process 226 acquires feature knowledge, which may involve learning the mean, standard deviation of the features over time. The feature learning process 226 receives features from energy detections determined to belong to the waveform N 222 by the energy detect likelihood test 228. The feature learning process 226 may use the Kalman Filter updates to state variables that represent the features of interest. For certain specific features, such as frequency, feature learning may include learning details such as channel bandwidth, spacing, and frequency usage, which may be learned via histograms. In general, feature learning 226 takes a new energy detection and utilizes the feature information provided to increase the feature knowledge of the waveform.

The waveform classification and error detection process 224 checks feature sets or potential waveforms generated by the blind acquisition tier 202 against the waveform classifications to determine if the feature set matches a frequency hopped signal type. Once the feature set statistics have converged enough to match a waveform classification, the waveform classification is updated with the information from the feature set. An identification of the waveform classification may also be reported to a user via the user interface. As described below, the energy detect maximum likelihood assignment test 230 determines if new energy detections are likely to belong to one of the waveforms N 222 already defined in the waveform classifications. The waveform classification and error detection process 224 may also check that the feature sets in the set of energy detections tracked by the energy detect maximum likelihood assignment test 230 still matches the original tasking guidelines. If a waveform sufficiently deviates from the original tasking guidelines, the waveform may be aborted or a new tasking may be generated.

The energy detection maximum likelihood assignment test 230 passes the energy detections to the energy detect likelihood test 228, which passes back the combined likelihood and weight for all N waveforms. The energy detection maximum likelihood assignment test 230 then decides if one of the waveforms should accept the energy detection and chooses the best waveform. If a waveform is not chosen, the energy detection is communicated to the blind acquisition tier (tier 1) 202. In deciding on a waveform, the energy detection maximum likelihood assignment test 230 takes the multiple active features in the waveforms and their respective likelihoods (i.e., Pr) and combines them into a single likelihood. In one example, the respective Pr's are multiplied together, according to $L(x|c)$, where x is a feature and c is a weak or full classifier. This final combined likelihood is then compared against a sigma multiple threshold for inclusion. The threshold is the probability of x given a mean of 0 with standard deviation of 1, where x can be 1 or more. Nominally, the system uses a 3 sigma threshold.

The lookback buffer 232 stores a series of energy detections representing a signal received over a predetermined period of time. In this way, the loopback buffer 232 provides a way of going back in time to process any missed energy detections using the best available waveform information while it is learned. The lookback buffer 232 is sized to an approximate worst case missed hop, blind acquisition time of a frequency hopped signal and also limited by the memory capacity of the system. While in most cases blind acquisition does not miss many hops, certain environments and hop rates may be more difficult.

If the energy detections 206 do not correlate with any existing active waveforms 222, the energy detections 206 may be communicated to a directed re-acquisition component 240. The directed re-acquisition component 240 tests each unassigned energy detection to determine if it belongs to any active potential waveforms within 240, which may include manually entered waveform classifications 260. A user may enter waveform classifications that specify a known frequency hopped signal. The manually entered waveform classifications 260 may be generated and stored using a similar data structure as the learned waveform classification 222. The directed re-acquisition component 240 uses feature statistics relating to past learned waveform classifications 222 or from the manually entered waveform classifications 260, as inputs to the known features joint classifier 242. The feature statistics for the joint classifier 242 are used to compute a likelihood of the unassigned energy detect belonging to any of the waveform classifications from past active waveforms from 220 or manually input waveform classifications 260. A joint likelihood test is performed to determine if the likelihood, as a Pr, is sufficient to establish that the unassigned energy detection is part of a potential waveform.

The directed re-acquisition component 240 reuses much of the same logic as that used in the blind acquisition tier 202 but with a filter specifying the allowed feature value. In addition, the directed re-acquisition tier 240 may include a classification error detection component to evaluate if the initial classification decision was correct. If a waveform sufficiently deviates from the original tasking guidelines, the waveform may be aborted or a new tasking may be generated.

In an example implementation, the signal identification system 120 (shown in FIG. 1A) may produce energy detection fragmentation due to marginal signal power or multipath fading. Such fragmentation interferes with the association of the energy detections with other whole and correct detections. Intelligent energy detect defragmentation is a method that may be used to join fragmented detections for use in the association algorithm. Two methods are available, blind and directed defragmentation. Blind defragmentation joins fragments by estimating the nominal distance between energy detections and joining those that fall significantly below that distance value. Directed defragmentation uses known information about the incoming energy detections to estimate which fragments belong together.

As noted above, the waveform tracking process 220 includes a periodic updates process 234, which may format, or store information for reports to be used by a report generator 250 to output information about the waveforms to the user. The periodic updates process 234 may keep the information for the reports and receive updated information as details of the waveforms are learned. In the early stage of an acquisition, the information may relate to unassigned energy detections or may include information relating to noise signals. The report generator 250 then uses the information to output a report based on the information received.

Figure 8A:
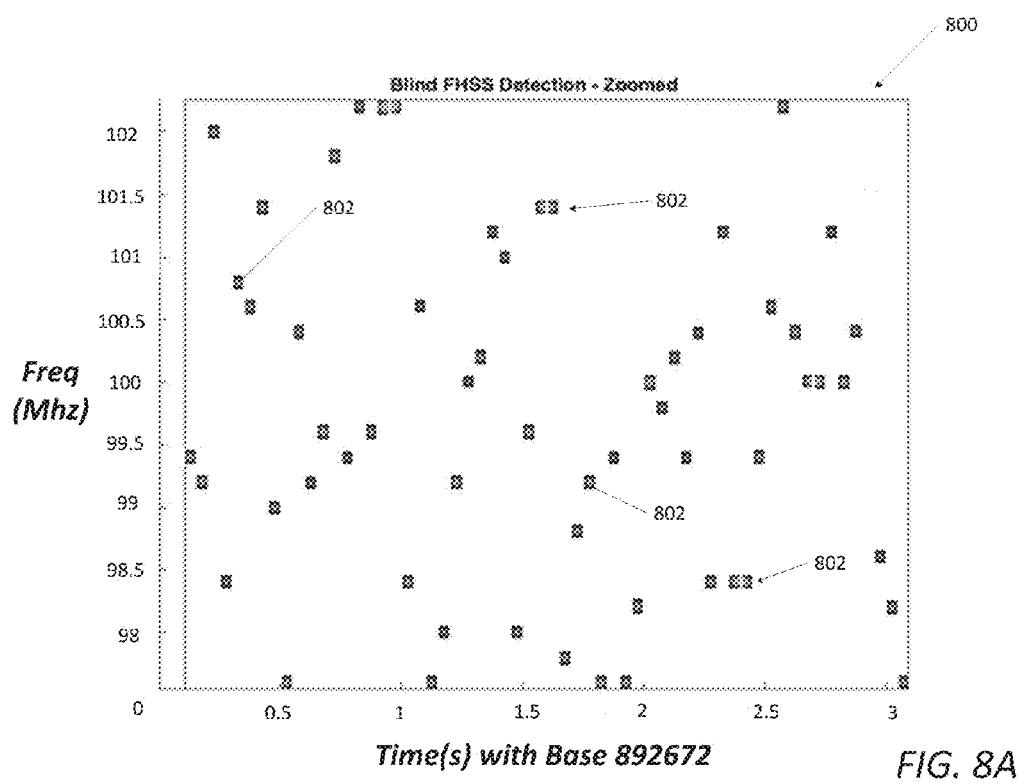
FIG. 8A is a screenshot of an example of a report for a blind acquisition of a frequency hopped signal (FHSS).

Typically, a report may be presented in a frequency hop map showing signal hops plotted as frequencies versus time. Turning to FIG. 8A, FIG. 8A is a screenshot of an example report 800 for a blind acquisition of a frequency hopped signal (FHSS). The process in progress as shown in FIG. 8A may include the results of the analysis of energy detections by the blind acquisition component 122, the full ensemble waveform classifier 124, and directed re-acquisition component 126 (all in FIG. 1A). The results of the analyses are plotted as hops 802 at frequency bandwidths and time slots of each hop. The hops 802 in the report 800 in FIG. 8A have frequency bands centered at a frequencies ranging from about 97.5 Mhz and about 102.5 Mhz, which may represent a zoomed view of the results as the overall bandwidth of the possible measurements may range much higher in example implementations. It is noted that the view illustrated in the report 800 in FIG. 8A may represent features of a feature set for an active waveform before a full specification of the features of the waveform can be made. As noted above, waveform classifications are learned over time. After a sufficient period of time, energy detections from a particular signal are consistently classified as belonging to a specific active waveform classification. The acquisitions of these energy detections are not actually "blind" after the sufficient time period in that the acquisitions are acquired based on the learned features of the corresponding active waveform classification. The learned features of the corresponding active waveform classifications thus become a priori knowledge of the details of the signal.

Figure 8B:
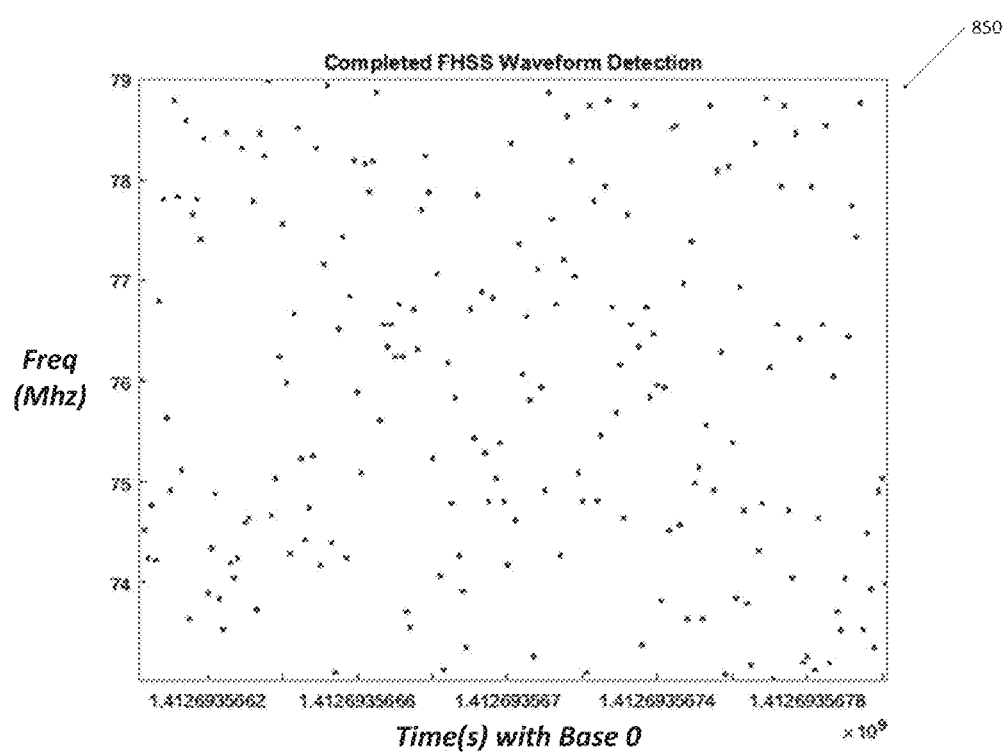
FIG. 8B is a screenshot of an example of a report of a completed FHSS waveform detection.

In FIG. 8B, an example of a screenshot of a report 850 of a completed FHSS detection is shown. The FHSS waveform detection may be deemed completed when energy detections are acquired and classified based on the learned features of an active waveform classification at the direct re-acquisition component 126 (in FIG. 1A). It is noted that the active waveform classification may be provided manually and stored as a waveform classification for which the details are known beforehand. In this example, the energy detections are acquired in a directed search by the direct re-acquisition component 126 (in FIG. 1A).

When an FHSS detection is complete, additional reports may be generated that provide details about the signal. Much of the details about the signal is stored as features and features sets stored as part of the waveform classifications as described above. Other details may be generated from the features and feature sets. An example FHSS Characteristics Output Report may provide the following details:
 1. Waveform ID: Blind Hopped 500 HPS;
 2. Waveform Seed: Phase Weak Classifier;
 3. Waveform Signal Class: FREQUENCY_HOPPER;
 4. Estimated Burst Size: 2000;
 5. Associated Energy Detects: 1916;
 6. Phase Estimate: 1.43639e+09 sec;
 7. Period Estimate: 500.238 μsec;
 8. Num Hits: 1916;
 9. Num Misses: 84;
 10. Power Estimate: 22.8259 dB;
 11. Dwell Estimate: 422.741 μsec;
 12. Width Estimate: 16194.9 Hz;
 13. Center Freq Estimate: 199.941 MHz;
 14. Centroid Freq Estimate: 199.647 MHz;
 15. Bandwidth Estimate: 4.88672 MHz; and
 16. DOA: 298 degrees.

Other types of information may be provided as well for other signal types, or in other implementations.

The above-described examples of implementations further include the following example implementations indicating manners in which variations of embodiments of the disclosure may arise. In one aspect of generating at least one waveform classification, the method includes: subsequently blindly acquiring features from the energy detections in the stream of digital signals; and performing ensemble learning comprising a plurality of learning methods to acquire features for generating the waveform classification.

In another aspect, the step of performing ensemble learning comprises, where the plurality of learning methods includes a phase acquisition method, acquiring an off-time period, an on-time period, an on-time phase and an off-time phase for energy detections corresponding to feature sets where the waveform classification indicates the signal is a frequency hopped sequence.

In another aspect, the step of performing ensemble learning includes: (where the plurality of learning methods includes a sequence arbiter method) tracking slots for a waveform having a waveform classification indicating the signal is a frequency hopped sequence; testing the identified energy detections to determine a probability of belonging to the frequency hopped sequence; and selecting the energy detection with the highest probability of belonging as part of the waveform.

In another aspect, the step of performing ensemble learning includes: (where the plurality of learning methods includes a sequence history method) storing the energy detection with the highest probability of belonging in a sequence history of slots in the waveform; storing the probability determined for the energy detection; and storing a sequence time indicating a time at which the energy detection was determined to be the highest probability energy detection.

In another aspect, the method may include steps of reporting the waveform classification and features set of the waveform classification by output to a user interface device.

Example implementations of a system for acquiring frequency hopped signals also may include the following examples. In one aspect, an example of an implementation of a system having a non-transitory computer-readable medium stores executable instructions for a full ensemble waveform classifier that, when executed by the processor, are operative to: subsequently blindly acquire features from the energy detections in the stream of digital signals; and correlate acquired features and the feature set using a maximum likelihood classifier.

In another aspect, the non-transitory computer-readable medium may store executable instructions for the full ensemble waveform classifier that, when executed by the processor, are operative to: subsequently blindly acquire features from the energy detections in the stream of digital signals; and perform ensemble learning comprising a plurality of learning methods to acquire features for generating the waveform classification.

In another example, the step of performing ensemble learning may include (where the plurality of learning methods includes a phase acquisition method) acquiring an off-time period, an on-time period, an on-time phase and an off-time phase for energy detections corresponding to feature sets where the waveform classification indicates the signal is a frequency hopped sequence.

In another aspect, the step of performing ensemble learning may include: (where the plurality of learning methods includes a sequence arbiter method) tracking slots for a waveform having a waveform classification indicating the signal is a frequency hopped sequence; testing the identified energy detections to determine a probability of belonging to the frequency hopped sequence; and selecting the energy detection with the highest probability of belonging as part of the waveform.

In another aspect, the step of performing ensemble learning may include (where the plurality of learning methods includes a sequence history method) storing the energy detection with the highest probability of belonging in a sequence history of slots in the waveform; storing the probability determined for the energy detection; and storing a sequence time indicating a time at which the energy detection was determined to be the highest probability energy detection.

In another aspect, an example system may further include a user interface device; and a waveform classification report generator configured to generate a report indicating the waveform classification and feature set of the wave form classification for output to the user interface device.

It will be understood that various aspects or details of the disclosure may be changed without departing from the scope of the disclosure. The above description is not exhaustive and does not limit the claimed disclosures to the precise form disclosed. Furthermore, the above description is for the purpose of illustration only, and not for the purpose of limitation. Modifications and variations are possible in light of the above description or may be acquired from practicing the disclosure. The claims and their equivalents define the scope of the disclosure.

What is claimed is:

1. A method for acquiring a frequency hopped signal with no prior knowledge about the frequency hopped signal, the method comprising:
    receiving a radio frequency (RF) signal at a receiver;
    converting the RF signal into a stream of digital signal levels;
    identifying energy detections in the stream of digital signal levels as possible hops of the frequency hopped signal;
    blindly acquiring a feature set for defining the frequency hopped signal from the energy detections by:
        acquiring shape features from the energy detections by determining signal bandwidth, dwell, and absolute power and performing a shape maximum likelihood classification to determine a likelihood that the energy detections belong to a same feature set without comparing to any predetermined parameters;
        acquiring frequency features from the energy detections by determining a signal center frequency, a frequency, a total bandwidth, and channel spacing for each energy detection and performing a frequency maximum likelihood classification to determine a likelihood that the energy detections belong to a same feature set without comparing to any predetermined parameters; and
        identifying at least one feature set from the shape maximum likelihood classification and from the frequency maximum likelihood classification;
    generating at least one waveform classification based on the at least one feature set;
    directly acquiring energy detections from the RF signal based on the waveform classification; and
    reporting the at least one waveform classification as the frequency hopped signal.

2. The method of claim 1, wherein the step of blindly acquiring the feature set includes
    measuring selected signal characteristics of the energy detections,
    identifying features from the measured signal characteristics, and
    determining a likelihood that identified features are correlated to form the feature set.

3. The method of claim 2, wherein the features identified from measured signal characteristics are features selected from a group consisting of
    detect power,
    on-time period/phase,
    off-time period/phase,
    detect frequency and bandwidth,
    direction of arrival, and
    waveform frequency use and bandwidth.

4. The method of claim 1, wherein the step of blindly acquiring the feature set comprises using a shape acquisition detector to measure signal characteristics corresponding to waveform shape characteristics.

5. The method of claim 1, wherein the step of blindly acquiring comprises detecting using a frequency acquisition detector to measure signal characteristics corresponding to waveform frequency characteristics.

6. The method of claim 1, wherein the step of blindly acquiring the feature set comprises using a time acquisition detector to measure signal characteristics corresponding to waveform time characteristics.

7. The method of claim 1, further including
    receiving RF signals at an N-antenna array, and
    pre-filtering the RF signals received at the N antennas based on direction of arrival,
    wherein the step of blindly acquiring comprises using a direction acquisition detector to detect a waveform direction of arrival.

8. The method of claim 1, wherein the step of blindly acquiring the features set further includes
    determining a probability density function ("PDF") for each feature, and
    utilizing the PDF of the feature to determine a likelihood that the feature set and other features are correlated.

9. The method of claim 8, further including utilizing a plurality of weak classifiers to determine a likelihood that acquired features and the feature set are correlated.

10. The method of claim 9, wherein the plurality of weak classifiers utilize Kalman filtering to compute a likelihood that an acquired feature belongs to the feature set.

11. The method of claim 1, wherein the step of generating the at least one waveform classification includes
subsequently blindly acquiring features from the energy detections in the stream of digital signals, and
correlating acquired features and the feature set utilizing the shape maximum likelihood classifier and the frequency maximum likelihood classifier.

12. A system for acquiring a frequency hopped signal with no prior knowledge about the frequency hopped signal, the system comprising:
a receiver including at least one antenna for receiving an RF signal;
a digitizer, wherein the digitizer is configured to perform analog to digital conversion of the RF signal and as a result, convert the RF signal to a digital signal stream;
an energy detector, wherein the energy detector is configured to identify energy detections in the digital signal stream;
a processor; and
a non-transitory computer-readable medium storing processor-executable instructions that when executed by the processor are configured to perform functions for
a blind acquisition component configured to blindly acquire a feature set to define a frequency hopped signal from the energy detections by:
acquiring shape features from the energy detections by determining signal bandwidth, dwell, and absolute power and performing a shape maximum likelihood classification to determine a likelihood that the energy detections belong to a same feature set without comparing to any predetermined parameters,
acquiring frequency features from the energy detections by determining a signal center frequency, a frequency, a total bandwidth, and channel spacing for each energy detection and performing a frequency maximum likelihood classification to determine a likelihood that the energy detections belong to a same feature set without comparing to any predetermined parameters, and
identifying at least one feature set from the shape maximum likelihood classification and from the frequency maximum likelihood classification,
a full ensemble waveform classifier that is configured to generate at least one waveform classification based on the feature set,
a directed re-acquisition component configured to acquire energy detections based on the waveform classification, and
a report generator that is configured to report the at least one waveform classification as a frequency hopped signal.

13. The system of claim 12, wherein the non-transitory computer-readable medium stores executable instructions for the blind acquisition component that, when executed by the processor, are configured to
measure selected signal characteristics of the energy detections,
identify features from the measured signal characteristics, and
determine a likelihood that identified features are correlated to form the feature set.

14. The system of claim 12, wherein the features identified from measured signal characteristics are features selected from a group consisting of
detect power,
on-time period/phase,
off-time period/phase,
detect frequency and bandwidth,
direction of arrival, and
waveform frequency use and bandwidth.

15. The system of claim 12, wherein the non-transitory computer-readable medium stores executable instructions for the blind acquisition component that, when executed by the processor, are operative to perform functions for a shape acquisition detector to measure signal characteristics corresponding to waveform shape characteristics.

16. The system of claim 12, wherein the non-transitory computer-readable medium stores executable instructions for the blind acquisition component that, when executed by the processor, are operative to perform functions for a time acquisition detector to measure signal characteristics corresponding to waveform time characteristics.

17. The system of claim 12, further including
an N-antenna array,
wherein the N-antenna array is configured to receive the RF signal and to pre-filter the RF signal received at the N antennas based on direction of arrival,
wherein the non-transitory computer-readable medium stores executable instructions for the blind acquisition component that, when executed by the processor, are operative to perform functions for a direction acquisition detector to detect a waveform direction of arrival.

18. The system of claim 12, wherein the non-transitory computer-readable medium stores executable instructions for the blind acquisition component that, when executed by the processor, are configured to
subsequently blindly acquire features from the energy detections in the stream of digital signals,
determine a probability density function ("PDF") for each feature, and
utilize the PDF of the feature to determine a likelihood that the feature set and subsequently acquired features are correlated.

19. The system of claim 18, further including a plurality of weak classifiers, where the plurality of weak classifiers are configured to determine a likelihood that acquired features and the feature set are correlated.

20. The system of claim 19, wherein the plurality of weak classifiers utilize Kalman filtering to compute a likelihood that an acquired feature belongs to the feature set.

* * * * *